US008971011B2

(12) United States Patent
Miyazaki

(10) Patent No.: US 8,971,011 B2
(45) Date of Patent: Mar. 3, 2015

(54) SEMICONDUCTOR DEVICE

(75) Inventor: Takayuki Miyazaki, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1553 days.

(21) Appl. No.: 12/554,245

(22) Filed: Sep. 4, 2009

(65) Prior Publication Data

US 2010/0238600 A1 Sep. 23, 2010

(30) Foreign Application Priority Data

Mar. 18, 2009 (JP) .................................. 2009-65809

(51) Int. Cl.
*H01G 5/00* (2006.01)
*H01H 59/00* (2006.01)

(52) U.S. Cl.
CPC ... *H01H 59/0009* (2013.01); *H01H 2059/0018* (2013.01)
USPC .......................................... 361/271; 361/277

(58) Field of Classification Search
USPC ................................ 361/271, 277, 280, 281
See application file for complete search history.

(56) References Cited

U.S. PATENT DOCUMENTS 5,578,976 A 11/1996 Yao
5,869,916 A * 2/1999 Suzuki et al. ................. 310/309
2007/0181411 A1* 8/2007 Ikehashi et al. ............... 200/181

FOREIGN PATENT DOCUMENTS

JP 2004-61937 2/2004
JP 2006-247820 9/2006
JP 2007-242607 9/2007

OTHER PUBLICATIONS

G. M. Rebeiz, "RF MEMS Theory, Design, and Technology", Wiley-Interscience, 2003, 1 page.
Office Action issued Jul. 5, 2011, in Japanese Patent Application No. 2009-065809 with English translation.

* cited by examiner

*Primary Examiner* — Danny Nguyen
(74) *Attorney, Agent, or Firm* — Oblon, Spivak, McClelland, Maier & Neustadt, L.L.P.

(57) ABSTRACT

A semiconductor device includes a first static actuator having a first drive electrode and a second drive electrode, the first drive electrode and the second drive electrode being capable of coming close to each other upon shifting from an open state to a close state due to an electrostatic attractive force against an elastic force thereof; a detection circuit configured to detect a temperature of the first static actuator; and a drive circuit configured to apply a first voltage between the first drive electrode and the second drive electrode to maintain the first static actuator in the closed state between the first drive electrode and the second drive electrode, and to switch a polarity of the first voltage every first time period. The drive circuit varies a length of the first time period based on a detection result of the detection circuit.

5 Claims, 9 Drawing Sheets

SEMICONDUCTOR DEVICE

CROSS REFERENCE TO RELATED APPLICATIONS

This application is based upon and claims the benefit of priority from the prior Japanese Patent Application No. 2009-65809, filed on Mar. 18, 2009, the entire contents of which are incorporated herein by reference.

BACKGROUND OF THE INVENTION

1. Field of the Invention

The present invention relates to a semiconductor device configured to control a static actuator utilizing MEMS (Micro Electro Mechanical Systems).

2. Description of the Related Art

In recent years, MEMS is receiving attention as one of technologies for achieving a miniaturization, a weight reduction, a lowering of power consumption, and an increased functionality in electronic equipment. This MEMS is a system that uses a silicon process technology to integrate minute mechanical elements and electronic circuit elements.

A structure of a static actuator utilizing this kind of MEMS technology is disclosed in U.S. Pat. No. 5,578,976. To set the static actuator to a closed state (a state in which an upper electrode and a lower electrode are in contact with an insulating film interposed therebetween), a potential difference is applied between the upper electrode and the lower electrode so that an electrostatic attractive force between these electrodes exceeds an elastic force of a movable portion to which the upper electrode is fixed.

In such a closed state of the static actuator, a state is reached where the upper electrode and the lower electrode are in contact with the insulating film interposed therebetween, thereby an electrostatic capacitance between the upper electrode and the lower electrode being greater than when in an open state. At this time, a charge may be injected into and trapped in the insulating film through FN (Fowler-Nordheim) tunneling or the Poole-Frenkel mechanism. This phenomenon is called dielectric-charging of the static actuator.

Further, when an amount of charge trapped in the insulating film due to dielectric-charging becomes greater than or equal to a certain value, the upper electrode is attracted by the charge in the insulating film and it becomes impossible to change the static actuator from the closed state to the open state, even if the potential difference between the upper electrode and the lower electrode is set to 0V. This phenomenon is called stiction due to dielectric charging.

To avoid such stiction, there is, for example, a method of inverting a polarity of potential between the upper electrode and the lower electrode (refer to G. M. Rebeiz: "RF MEMS Theory, Design, and Technology", Wiley-Interscience, 2003, pp. 190-191).

When the above-described method is used, there is a problem that a cycle for inverting the polarity is faster than necessary, leading to an increase in power consumption.

Additionally in the case of using the above-described method, if electrodes of a plurality of actuators, capacitors, and the like, are disposed adjacently, noise accompanying the above-described polarity inversion is generated along with a signal applied to those electrodes.

SUMMARY OF THE INVENTION

A semiconductor device in accordance with a first aspect of the present invention includes: a first static actuator having a first drive electrode and a second drive electrode, the first drive electrode and the second drive electrode being capable of coming close to each other upon shifting from an open state to a close state due to an electrostatic attractive force against an elastic force thereof; a detection circuit configured to detect a temperature of the first static actuator; and a drive circuit configured to apply a first voltage between the first drive electrode and the second drive electrode to maintain the first static actuator in the closed state, and to switch a polarity of the first voltage every first time period, the drive circuit varying a length of the first time period based on a detection result of the detection circuit.

A semiconductor device in accordance with a second aspect of the present invention includes: a first static actuator having a first drive electrode and a second drive electrode, the first drive electrode and the second drive electrode being capable of coming close to each other upon shifting from an open state to a close state due to an electrostatic attractive force against an elastic force thereof; a first electrode provided at a position adjacent to the first drive electrode or the second drive electrode; and a drive circuit configured to apply a first voltage between the first drive electrode and the second drive electrode to maintain the first static actuator in the closed state, and to switch a polarity of the first voltage every first time period, the drive circuit applying a second voltage to the first electrode, the second voltage having a polarity that varies with a second time period, and the second time period and the second voltage being set so that a signal generated due to the first time period and the first voltage is attenuated by a signal generated due to the second time period and the second voltage.

DETAILED DESCRIPTION OF THE EMBODIMENTS

Embodiments of the present invention are now described in detail with reference to the drawings.

First Embodiment

Figure 1:
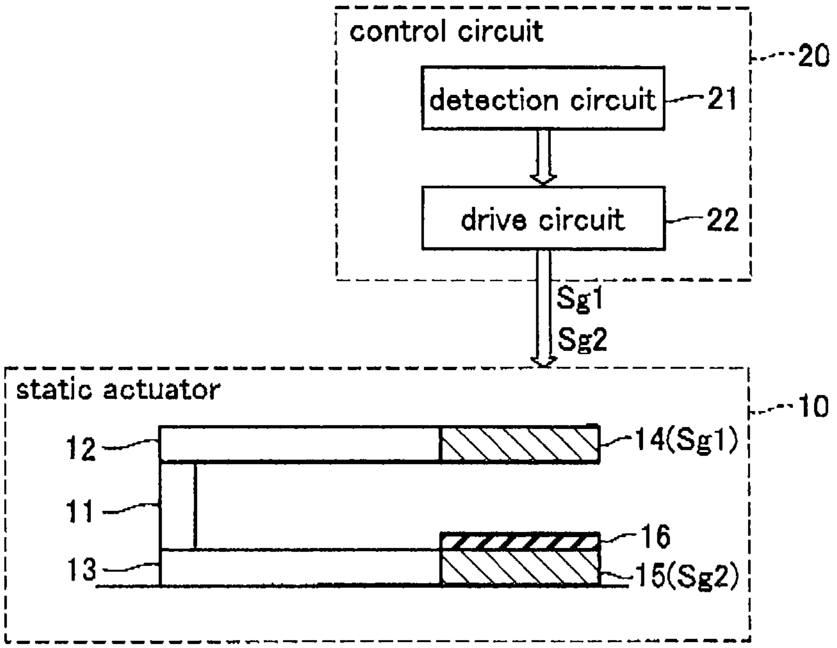
FIG. 1 is a schematic view showing a semiconductor device in accordance with a first embodiment of the present invention.

Configuration of a Semiconductor Device in Accordance with a First Embodiment First, a configuration of a semiconductor device in accordance with a first embodiment is described with reference to FIG. 1. FIG. 1 is a schematic view showing the semiconductor device in accordance with the first embodiment of the present invention.

The semiconductor device in accordance with the first embodiment includes a static actuator 10 adopting an electrostatic type system, and a control circuit 20 for controlling the static actuator 10, as shown in FIG. 1. The semiconductor device in accordance with the first embodiment has a cantilever structure with a single support. The static actuator 10 and the control circuit 20 may be formed on a single silicon substrate using MEMS technology, or they may each be formed on separate silicon substrates.

The static actuator 10 includes a supporting portion 11, a movable portion 12, a fixed portion 13, an upper drive electrode 14, a lower drive electrode 15, and an insulating film 16, as shown in FIG. 1. The supporting portion 11 is fixed to a silicon substrate. The movable portion 12 has one end thereof attached to the supporting portion 11 and is movable with respect to the supporting portion 11 due to its flexibility. The fixed portion 13 has one end thereof attached to the supporting portion 11 and is fixed with respect to the supporting portion 11. The upper drive electrode 14 is fixed to another end of the movable portion 12. The lower drive electrode 15 is fixed to another end of the fixed portion 13 so as to oppose the upper drive electrode 14. The insulating film 16 is formed on a surface of the lower drive electrode 15. The upper drive electrode 14 and the lower drive electrode 15 are supplied with a voltage required for operation by the control circuit 20.

Figure 2:
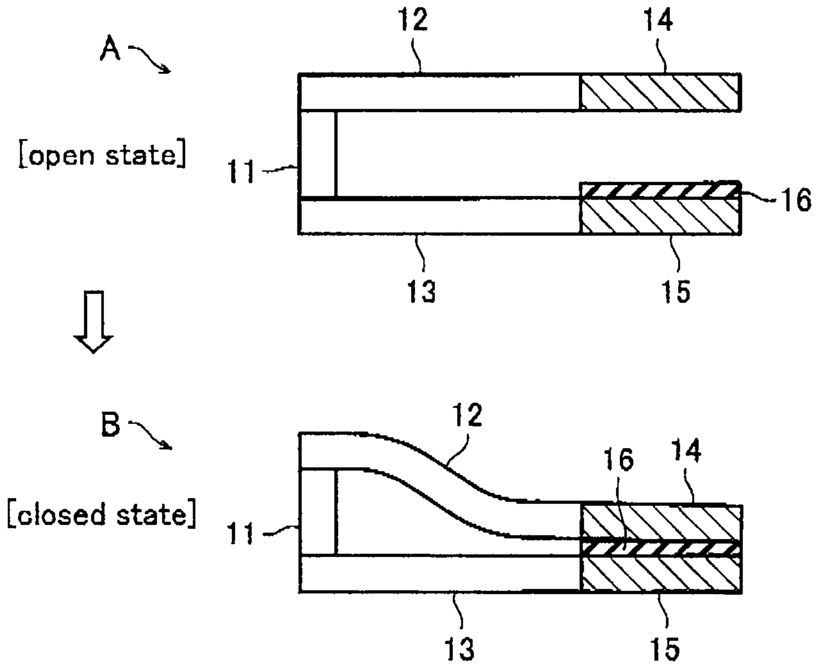
FIG. 2 is a view showing an open state and a closed state of the first embodiment.

The static actuator 10 is controlled to be in an open state (a state in which the upper electrode 14 and the lower electrode 15 are separated) shown in A of the FIG. 2, and a closed state (a state in which the upper drive electrode 14 and the lower drive electrode 15 are in contact with the insulating film 16 interposed therebetween) shown in B of the same figure. That is to say, the upper drive electrode 14 and the lower drive electrode 15 are capable of coming close to each other upon shifting from an open state to a close state due to an electrostatic attractive force against an elastic force thereof.

The control circuit 20 includes a detection circuit 21 and a drive circuit 22. The detection circuit 21 detects a temperature T (hereafter referred to as "detected temperature T") of the static actuator 10.

Figure 3:
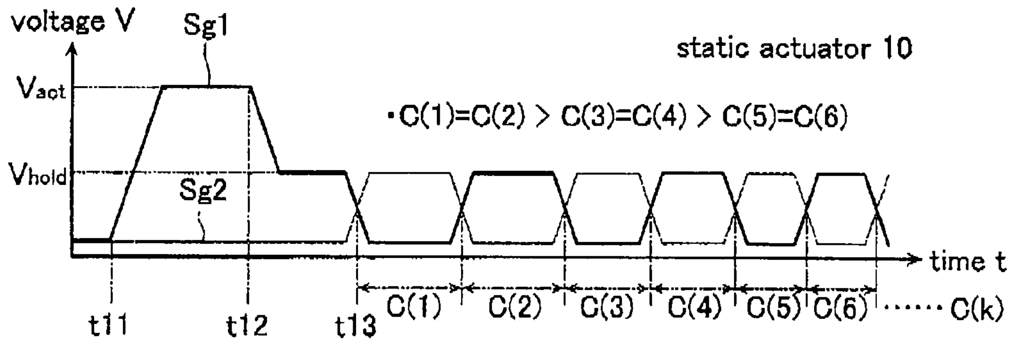
FIG. 3 is a timing chart showing a signal Sg1 and a signal Sg2 applied to an upper drive electrode 14 and a lower drive electrode 15, respectively, in accordance with the first embodiment.

The drive circuit 22 inputs a signal Sg1 and a signal Sg2 to the upper drive electrode 14 and the lower drive electrode 15, respectively, and thereby applies a certain voltage between the upper drive electrode 14 and the lower drive electrode 15. As shown in FIG. 3, the drive circuit 22 applies an actuating voltage Vact between the upper drive electrode 14 and the lower drive electrode 15. The actuating voltage Vact is used for changing the static actuator 10 from the open state to the closed state. The drive circuit 22 applies a hold voltage Vhold between the upper drive electrode 14 and the lower drive electrode 15. The hold voltage Vhold is used for maintaining the static actuator 10 in the closed state and is not more than the actuating voltage Vact. In addition, the drive circuit 22 switches a polarity of the hold voltage Vhold every time period C(k). In addition, the drive circuit 22 varies a length of the time period C(k) based on a detection result of the detection circuit 21.

Operation of the Semiconductor Device in Accordance with the First Embodiment FIG. 3 is a timing chart showing the signal Sg1 and the signal Sg2 applied to the upper drive electrode 14 and the lower drive electrode 15, respectively. In an initial state shown in FIG. 3, the signals Sg1 and Sg2 are set to a ground voltage Vss and the static actuator 10 is set in the open state. First, at time t11, the drive circuit 22 raises the signal Sg1 to the actuating voltage Vact. As a result, the actuating voltage Vact is applied between the upper drive electrode 14 and the lower drive electrode 15, and the static actuator 10 changes to the closed state. Next, at time t12, the drive circuit 22 lowers the signal Sg1 to the hold voltage Vhold. As a result, the hold voltage Vhold is applied between the upper drive electrode 14 and the lower drive electrode 15, and the static actuator 10 is maintained in the closed state.

Then, at times t13 and after, the drive circuit 22 switches the signal Sg1 and the signal Sg2 alternately between the ground voltage Vss and the hold voltage Vhold with a time period C(k) (k=1, 2, 3, . . . ) that is set based on the detected temperature T. That is to say, the polarity of the hold voltage Vhold is changed every time period C(k). In an odd-numbered time period C(2n−1) [where n is an integer greater than or equal to 1], the signal Sg2 (the lower drive electrode 15) becomes a higher voltage. And in an even-numbered time period C(2n), the signal Sg1 (the upper drive electrode 14) becomes a higher voltage.

Figure 4:
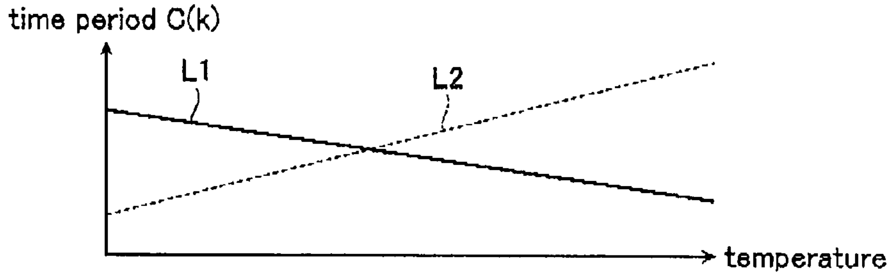
FIG. 4 is a view showing a temperature dependency of a cycle C(k) in accordance with the first embodiment.

A length of the odd-numbered time period C(2n−1) is set so as to have a certain ratio to a length of the following even-numbered time period C(2n). The time period C(k) is continuously varied by the drive circuit 22 in accordance with the detected temperature T, as shown in FIG. 4. Here, when the static actuator 10 has a structure in which dielectric charging is accelerated by a temperature rise, the time period C(k) is controlled to become shorter with rising detected temperature T rises (refer to line L1 in FIG. 4). On the other hand, when the static actuator 10 has a structure in which dielectric charging is decelerated by a temperature rise, the time period C(k) is controlled to become longer as the detected temperature T rises (refer to line L2 in FIG. 4). That is to say, according to a physical property of the static actuator 10, there are cases in which the time period C(k) should be made longer with a rise in the temperature T, and, conversely, cases in which the time period C(k) should be made shorter with a rise in the temperature T.

Advantage of the Semiconductor Device in Accordance with the First Embodiment In the semiconductor device in accordance with the first embodiment, the drive circuit 22 varies the length of the time period C(k) according to the detected temperature T and inverts the polarity between the upper drive electrode 14 and the lower drive electrode 15 every time periods C(k).

When the static actuator 10 has a structure in which dielectric charging is accelerated by a temperature rise, the drive circuit sets the time period C(k) to a shorter period as the temperature rise. As a result, in the semiconductor device in accordance with the first embodiment, even when a time taken for charging is shortened due to the temperature rise, stiction can be prevented from occurring prior to inversion of the polarity.

Conversely, when the static actuator 10 has a structure in which dielectric charging is decelerated by a temperature rise, the drive circuit sets the time period C(k) to longer period as the temperature rises. As a result, in the semiconductor device in accordance with the first embodiment, when a time taken for charging is lengthened due to the temperature rise, the frequency of inversion of the polarity can be lowered and the power consumption reduced.

That is to say, in the semiconductor device in accordance with the first embodiment, it is possible both to prevent occurrence of stiction and thereby maintain a normal operating state of the actuator, and at the same time to curb an increase in power consumption.

Second Embodiment

Operation of a Semiconductor Device in Accordance with a Second Embodiment

Next, an operation of a semiconductor device in accordance with a second embodiment is described with reference to FIG. 5. Note that in the second embodiment, identical symbols are assigned to configurations similar to those in the first embodiment and descriptions thereof are omitted.

In the static actuator 10 in accordance with the second embodiment, progression of dielectric charging depends on the direction of the applied voltage between the upper drive electrode 14 and the lower drive electrode 15. Suppose that the degree of progression of dielectric charging a voltage is applied in a direction from the upper drive electrode 14 to the lower drive electrode 15 is A, while that when a voltage is applied in the opposite direction is B. The ratio of A to B varies with temperature T. For example, the ratio rises or falls with the temperature rise (whether it rises or falls depends on the physical behavior of the static actuator 10).

Figure 5:
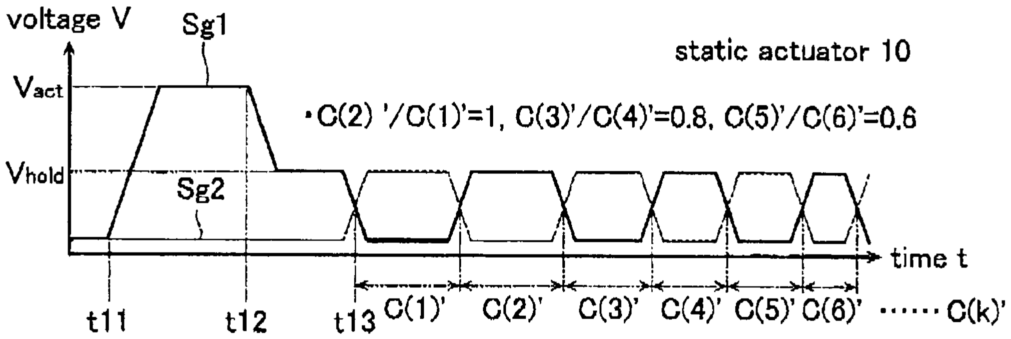
FIG. 5 is a timing chart showing a signal Sg1 and a signal Sg2 applied to an upper drive electrode 14 and a lower drive electrode 15, respectively, in accordance with a second embodiment.

The drive circuit 22 in accordance with the second embodiment varies the ratio of the even-numbered time period C(2n)' to the preceding odd-numbered time period C(2n−1)' with the temperature rise, as shown in FIG. 5. For example, the ratio is set to C(2)'/C(1)'=1, C(4)'/C(3)'=0.8, and C(6)'/C(5)'=0.6, with the temperature rise. Other operation in accordance with the second embodiment is similar to that of the first embodiment.

Advantage of the Semiconductor Device in Accordance with the Second Embodiment The semiconductor device in accordance with the second embodiment has the same advantages as that of the first embodiment due to the detection circuit 21 and the drive circuit 22. Furthermore, even if the ratio of the degree of progression of dielectric charging varies with the temperature rise as mentioned above, the semiconductor device in accordance with the second embodiment can maintain the normal operating state of the actuator, and at the same time curb the increase in power consumption, due to the above-described configuration.

Third Embodiment

Configuration of a Semiconductor Device in Accordance with a Third Embodiment Next, a configuration of a semiconductor device in accordance with a third embodiment is described with reference to FIG. 6. Note that in the third embodiment, identical symbols are assigned to configurations similar to those in the first and second embodiments and descriptions thereof are omitted.

Figure 6:
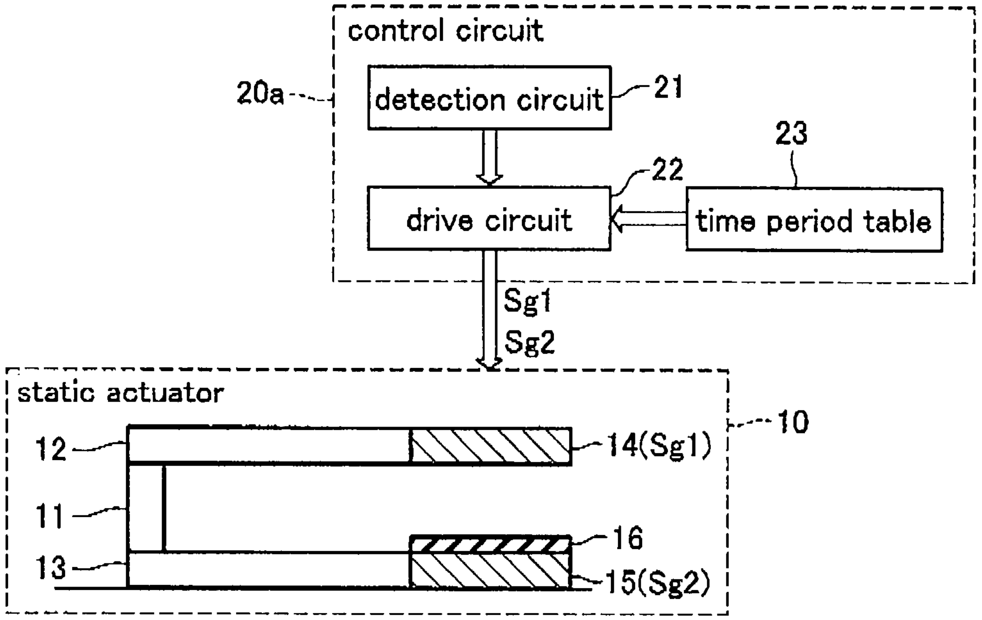
FIG. 6 is a schematic view showing a semiconductor device in accordance with a third embodiment of the present invention.
Figure 7:
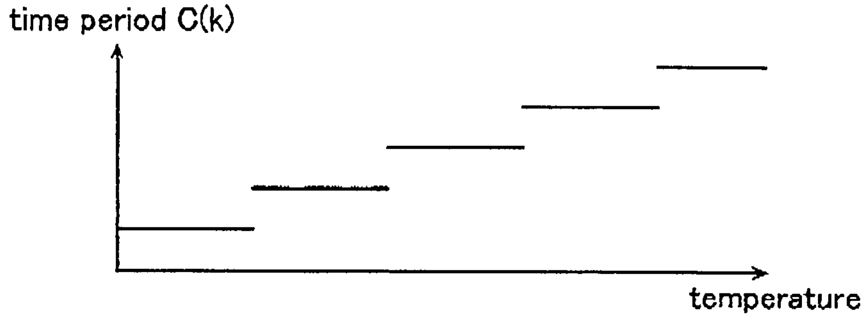
FIG. 7 is a view showing a temperature dependency of a cycle C(k) in accordance with the third embodiment.

The third embodiment differs from the first embodiment in that a control circuit **20*a* includes a time period table 23, as shown in FIG. 6. The time period table 23 is configured such that a certain time period C(k) is matched to the detected temperature T. On the basis of the time period table 23, the drive circuit 22 varies the time period C(k) stepwise based on the detected temperature T, avoiding a specific value, as shown in FIG. 7**.

Figure 8:
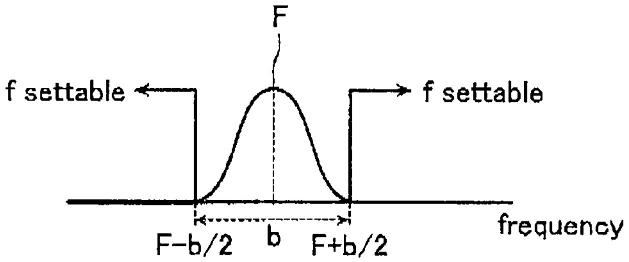
FIG. 8 is a view showing a relation between a frequency f of signals Sg1 and Sg2 and a frequency F of a signal used for sending/receiving to/from a peripheral circuit in accordance with the third embodiment.

Specifically, a frequency f of the signals Sg1 and Sg2 for setting the time period C(k) is set so as not to coincide with a frequency F (band b) of a signal used in sending/receiving to/from a peripheral circuit of the control circuit **20*a*, as shown in FIG. 8**. In addition, the frequency f is set so as also not to coincide with N times (where N is a positive integer) or an Nth fraction of the frequency F (band b). That is to say, the frequency f is set so as to avoid a region AR below. The region AR is $F-(b/2) \leq AR \leq F+(b/2)$, $(N\times F)-(b/2) \leq AR \leq (N\times F)+(b/2)$, $(F/N)-(b/2) \leq AR \leq (F/N)+(b/2)$.

Advantage of the Semiconductor Device in Accordance with the Third Embodiment The semiconductor device in accordance with the third embodiment has the same advantages as that of the first embodiment due to the detection circuit 21 and the drive circuit 22.

Furthermore, on the basis of the time period table 23, the drive circuit 22 in the semiconductor device in accordance with the third embodiment varies the time period C(k) stepwise based on the detected temperature T, avoiding a specific value. Moreover, the frequency f of the signals Sg1 and Sg2 resulting from the time period C(k) is set so as not to coincide with the frequency F of the signal used in sending/receiving to/from the peripheral circuit of the control circuit 20*a*. Consequently, in the semiconductor device in accordance with the third embodiment, there is no imparting of noise to the signal used in sending/receiving to/from the peripheral circuit of the control circuit 20*a*.

Fourth Embodiment

Configuration of a Semiconductor Device in Accordance with a Fourth Embodiment Next, a configuration of a semiconductor device in accordance with a fourth embodiment is described with reference to FIG. 9. Note that in the fourth embodiment, identical symbols are assigned to configurations similar to those in the first through third embodiments and descriptions thereof are omitted.

Figure 9:
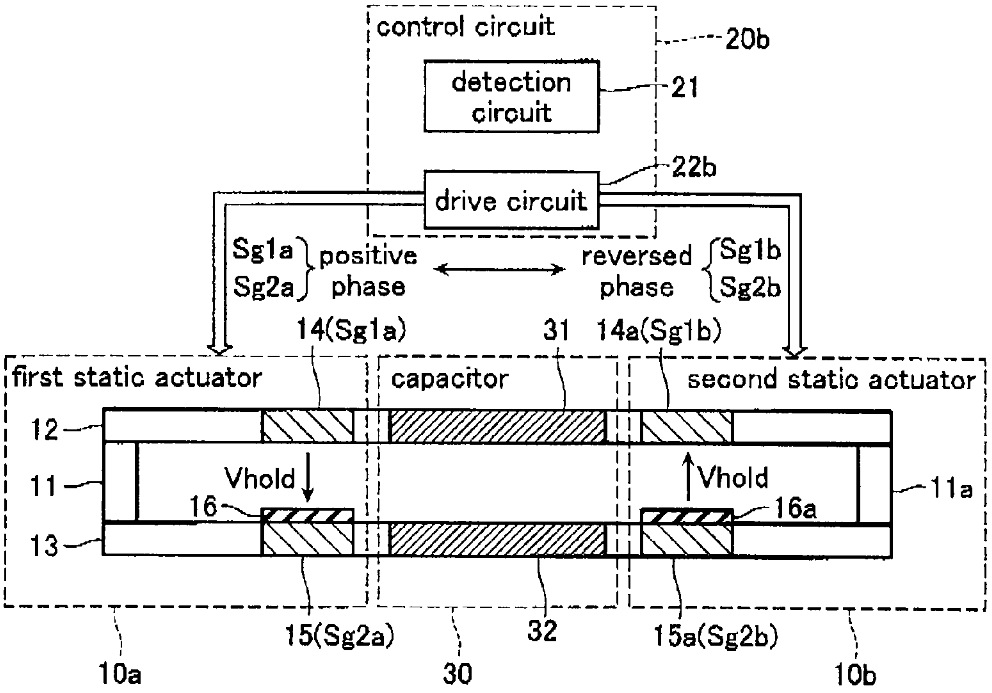
FIG. 9 is a schematic view showing a semiconductor device in accordance with a fourth embodiment of the present invention.

The semiconductor device in accordance with the fourth embodiment differs from that of the first embodiment in that it includes a double cantilever structure with supporting portions 11 and 11*a* at a left and right end of the movable portion 12 and the fixed portion 13, and also includes two static actuators (a first static actuator 10*a*, and a second static actuator 10*b*), a control circuit 20*b* configured to control the two static actuators, and a capacitor 30 controlled by the two static actuators, as shown in FIG. 9.

The first static actuator 10*a* includes the supporting portion 11, the movable portion 12, the fixed portion 13, the upper drive electrode 14, the lower drive electrode 15, and the insulating film 16 similar to those of the static actuator 10 in the first embodiment. The upper drive electrode 14 is provided at the left side of the movable portion 12. The lower drive electrode 15 is provided at the left side of the fixed portion 13 below the upper drive electrode 14 so as to oppose the upper drive electrode 14.

The second static actuator 10*b* shares the movable portion 12 and the fixed portion 13 with the first static actuator 10*a*, and also includes a supporting portion 11*a*. In addition, the second static actuator 10*b* includes a upper drive electrode 14*a*, a lower drive electrode 15*a*, and an insulating film 16*a*. The upper drive electrode 14*a* is provided at the right side of the movable portion 12. That is to say, the upper drive electrode 14*a* is formed in a position symmetrical to the upper drive electrode 14 sandwiching the capacitor 30 therebetween. The lower drive electrode 15*a* is provided at the right side of the fixed portion 13 so as to oppose the upper drive electrode 14*a*. That is to say, the lower drive electrode 15*a* is formed in a position symmetrical to the lower drive electrode 15 sandwiching the capacitor 30 therebetween. The upper drive electrode 14*a* and the lower drive electrode 15*a* are capable of coming close to each other upon shifting from an open state to a close state due to an electrostatic attractive force against an elastic force thereof.

The capacitor 30 includes an upper signal electrode 31 and a lower signal electrode 32. The upper signal electrode 31 is provided at a center of the movable portion 12 (between the upper drive electrodes 14 and 14*a*). The lower signal electrode 32 is provided at a center of the fixed portion 13 (between the lower drive electrodes 15 and 15*a*) so as to oppose the upper signal electrode 31. In the capacitor 30, a distance between the upper signal electrode 31 and the lower signal electrode 32 is controlled by the two static actuators 10*a* and 10*b*, and thereby the capacitance of the capacitor 30 being variable.

The control circuit 20*b* includes a drive circuit 22*b* configured to control the first and second static actuators 10*a* and 10*b*, as shown in FIG. 9. The drive circuit 22*b* inputs a signal Sg1*a* and a signal Sg2*a* to the upper drive electrode 14 and the lower drive electrode 15, respectively, applies the actuating voltage Vact and the hold voltage Vhold between the upper drive electrode 14 and the lower drive electrode 15, and also switches the polarity of the hold voltage Vhold based on the detected temperature T every time period C(k). In addition, the drive circuit 22*b* inputs a signal Sg1*b* and a signal Sg2*b* to the upper drive electrode 14*a* and the lower drive electrode 15*a*, respectively, applies the actuating voltage Vact and the hold voltage Vhold between the upper drive electrode 14*a* and the lower drive electrode 15*a*, and also switches the polarity of the hold voltage Vhold based on the detected temperature T every time period C(k). An operation at each of the static actuators 10*a* and 10*b* is not different from the above-mentioned embodiments. However, the signal Sg1*b* is a signal with a reversed phase (a signal with a 180° phase difference) with respect to the signal Sg1*a*, and the signal Sg2*b* is a signal with a reversed phase (a signal with a 180° phase difference) with respect to the signal Sg2*a*. Consequently, since a signal generated due to the hold voltage Vhold of the upper drive electrode 14 and the lower drive electrode 15, and a signal generated due to the hold voltage Vhold of the upper drive electrode 14*a* and the lower drive electrode 15*a* are 180° out of phase, these signals are cancelled out, thereby reducing noise.

Here, a length of a time period and a size of a voltage of the signals inputted to the first static actuator 10*a* may differ from those of the signals inputted to the second static actuator 10*b*. Moreover, a phase difference between the signal Sg1*b* and the signal Sg1*a*, and a phase difference between the signal Sg2*b* and the signal Sg2*a* are not limited to 180°. That is to say, the time period and the voltage of the signal inputted to the upper drive electrode 14*a* and the lower drive electrode 15*a* need only be set so that the signal generated due to the time period and the voltage of the signal inputted to the upper drive electrode 14 and the lower drive electrode 15 is attenuated by the signal generated due to the time period and the voltage of the signal inputted to the upper drive electrode 14*a* and the lower drive electrode 15*a*.

Figure 10:
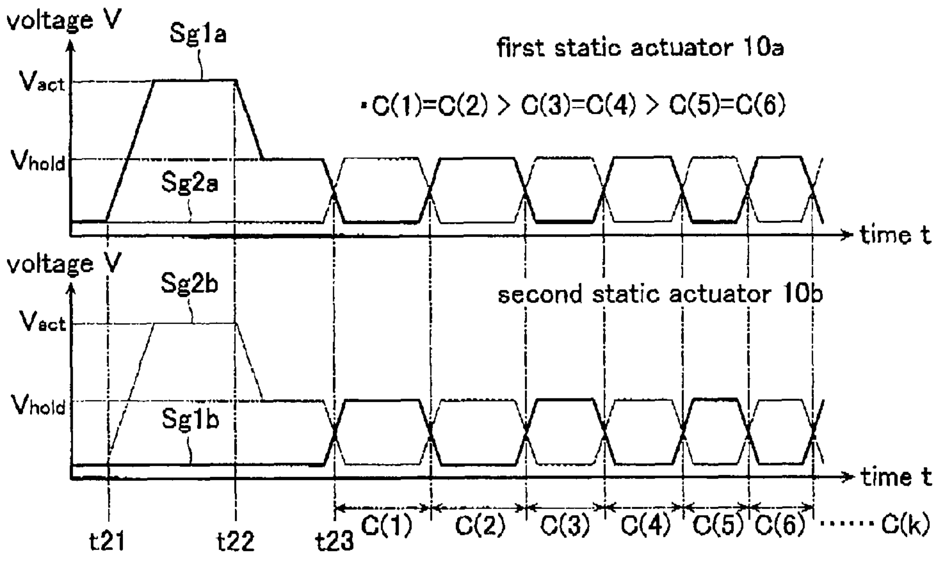
FIG. 10 is a timing chart showing a signal Sg1*a* and a signal Sg2*a* applied to an upper drive electrode 14 and a lower drive electrode 15, respectively, and a signal Sg1*b* and a signal Sg2*b* applied to an upper drive electrode 14*a* and a lower drive electrode 15*a*, respectively, in accordance with the fourth embodiment.

Operation of the Semiconductor Device in Accordance with the Fourth Embodiment FIG. 10 is a timing chart showing the signal Sg1*a* and the signal Sg2*a* applied to the upper drive electrode 14 and the lower drive electrode 15, respectively, and the signal Sg1*b* and the signal Sg2*b* applied to the upper drive electrode 14*a* and the lower drive electrode 15*a*, respectively. In an initial state shown in FIG. 10, the signals Sg1*a*, Sg2*a*, Sg1*b*, and Sg2*b* are set to the ground voltage Vss and the two static actuators 10*a* and 10*b* are set in the open state. As shown in FIG. 10, at time t21, the drive circuit 22*b* raises the signals Sg1*a* and Sg2*b* to the actuating voltage Vact. As a result, the actuating voltage Vact is applied between the upper drive electrode 14 and the lower drive electrode 15 and between the upper drive electrode 14*a* and the lower drive electrode 15*a*, and the two static actuators 10*a* and 10*b* are switched from the open state to the closed state. Next, at time t22, the drive circuit 22*b* lowers the signals Sg1*a* and Sg2*b* to the hold voltage Vhold. As a result, the hold voltage Vhold is set between the upper and lower drive electrodes 14 and 15 and between the upper and lower drive electrodes 14*a* and 15*a*, and the two static actuators 10*a* and 10*b* are maintained in the closed state.

Then, at times t23 and after, the drive circuit 22*b* switches the signal Sg1*a* and the signal Sg2*a*, and the signal Sg1*b* and the signal Sg2*b* alternately between the ground voltage Vss and the hold voltage Vhold with the time period C(k) that is based on the detected temperature T. Here, in the odd-numbered time period C(2n−1), the signal Sg2*a* (the lower drive electrode 15) and the signal Sg1*b* (the upper drive electrode 14*a*) become a higher voltage. And in the even-numbered time period C(2n), the signal Sg1*a* (the upper drive electrode 14) and the signal Sg2*b* (the lower drive electrode 15*a*) become a higher voltage.

Advantage of the Semiconductor Device in Accordance with the Fourth Embodiment The semiconductor device in accordance with the fourth embodiment has the same advantages as that of the first embodiment due to the detection circuit 21 and the drive circuit 22*b*.

A comparative example not having the second static actuator 10*b* is here considered. It is assumed that, in the comparative example, when the first static actuator 10*a* is in the closed state, a capacitance between the upper drive electrode 14 and the lower drive electrode 15 is 1 pF, and a capacitance between the upper drive electrode 14 and the upper signal electrode 31 is 4 fF. In such a case in the comparative example, when a voltage of the upper drive electrode 14 changes from 0V to 10V, noise of about 40 mV is generated in the upper signal electrode 31.

In contrast, in the fourth embodiment, the drive circuit 22*b* applies to the upper drive electrode 14*a* (the second static actuator 10*b*) the signal Sg1*b* that has a reversed phase with respect to the signal Sg1*a* applied to the upper drive electrode 14 (the first static actuator 10*a*). Thereby, an effect of the two signals is cancelled out to suppress a noise arising due to the signal applied to the upper signal electrode 31.

Moreover, in the fourth embodiment, the drive circuit 22*b* applies to the lower drive electrode 15*a* (the second static actuator 10*b*) the signal Sg2*b* that has a reversed phase with respect to the signal Sg2*a* applied to the lower drive electrode 15 (the first static actuator 10*a*). Thereby, an effect of the two signals is cancelled out to suppress a noise arising due to the signal applied to the lower signal electrode 32.

Fifth Embodiment

Figure 11:
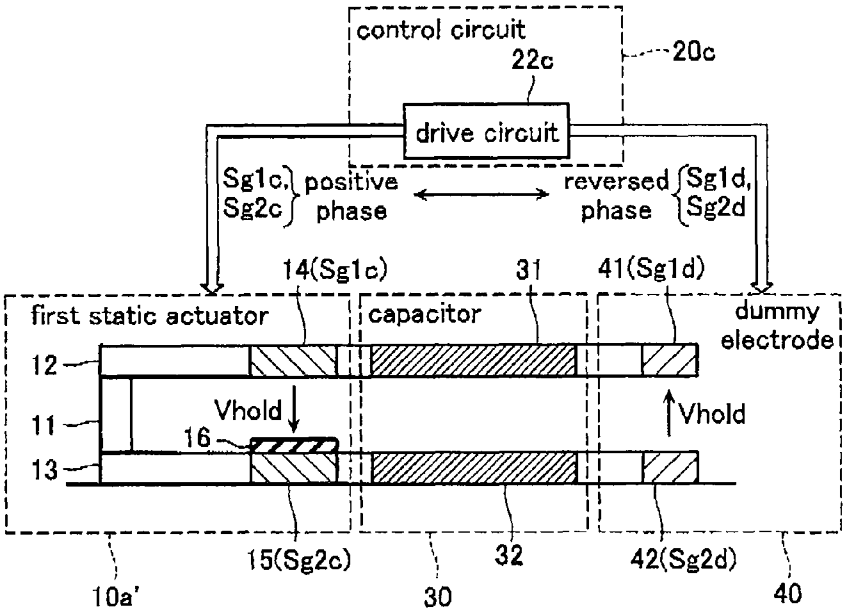
FIG. 11 is a schematic view showing a semiconductor device in accordance with a fifth embodiment of the present invention.

Configuration of a Semiconductor Device in Accordance with a Fifth Embodiment Next, a configuration of a semiconductor device in accordance with a fifth embodiment is described with reference to FIG. 11. Note that in the fifth embodiment, identical symbols are assigned to configurations similar to those in the first through fourth embodiments and descriptions thereof are omitted.

The semiconductor device according to the fifth embodiment and sixth through fourteenth embodiments described later is characterized in the feature for eliminating noise generated in the static actuators. As shown in FIG. 11, the semiconductor device in accordance with the fifth embodiment has a cantilever structure and includes a first static actuator 10*a*' and a dummy electrode 40 in place of the second static actuator 10*b*. The dummy electrode 40 is not controlled to be in the open state or the closed state like the first static actuator 10*a*', but is utilized for eliminating noise arising in the first static actuator 10*a*'. In the semiconductor device in accordance with the fifth embodiment, the detection circuit 21 is omitted. That is to say, the semiconductor device in accordance with the fifth embodiment includes a control circuit 20*c* configured by only a drive circuit 22*c*; instead of varying the length of the time period according to the temperature T, it aims to eliminate the above-described noise, and thereby differs from the fourth embodiment in this point.

The dummy electrode 40 includes an upper dummy electrode 41 and a lower dummy electrode 42. The upper dummy electrode 41 is provided at another end of the movable portion 12. The lower dummy electrode 42 is provided at another end of the fixed portion 13.

The drive circuit 22*c* inputs a signal Sg1*c* and a signal Sg2*c* to the upper drive electrode 14 and the lower drive electrode 15, respectively, applies the actuating voltage Vact and the hold voltage Vhold between the upper drive electrode 14 and the lower drive electrode 15, and also switches the polarity of the hold voltage Vhold every time period Ca(k). In addition, the drive circuit 22*c* inputs a signal Sg1*d* and a signal Sg2*d* to the upper dummy electrode 41 and the lower dummy electrode 42, respectively, applies the hold voltage Vhold between the upper dummy electrode 41 and the lower dummy electrode 42, and also switches the polarity of the hold voltage Vhold every time period Ca(k). The signal Sg1*d* is a signal with a reversed phase (a signal with a 180° phase difference) with respect to the signal Sg1*c*, and the signal Sg2*d* is a signal with a reversed phase (a signal with a 180° phase difference) with respect to the signal Sg2*c*.

Here, a length of a time period and a magnitude of a voltage of the signals inputted to the first static actuator 10*a*' may differ from those of the signals inputted to the dummy electrode 40. Moreover, a phase difference between the signal Sg1*c* and the signal Sg1*d*, and a phase difference between the signal Sg2*c* and the signal Sg2*d* is not limited to 180°. That is to say, the time period and the voltage of the signal inputted to the upper dummy electrode 41 and the lower dummy electrode 42 need only be set so that the signal generated due to the time period and the voltage of the signal inputted to the upper drive electrode 14 and the lower drive electrode 15 is attenuated by the signal generated due to the time period and the voltage of the signal inputted to the upper dummy electrode 41 and the lower dummy electrode 42.

Figure 12:
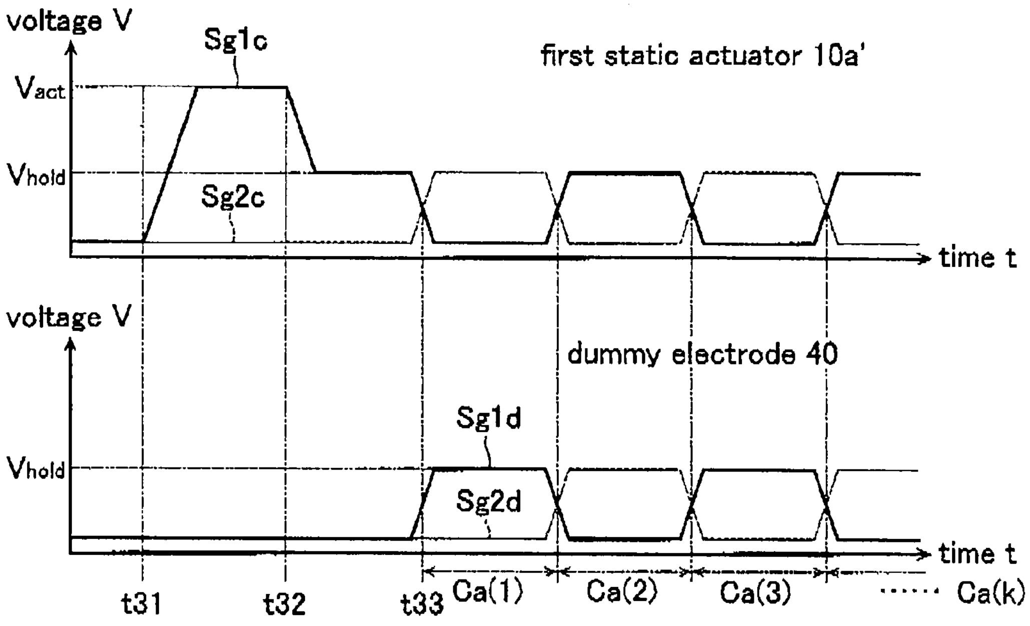
FIG. 12 is a timing chart showing a signal Sg1*c* and a signal Sg2*c* applied to an upper drive electrode 14 and a lower drive electrode 15, respectively, and a signal Sg1*d* and a signal Sg2*d* applied to an upper dummy electrode 41 and a lower dummy electrode 42, respectively, in accordance with the fifth embodiment.

Operation of the Semiconductor Device in Accordance with the Fifth Embodiment FIG. 12 is a timing chart showing the signal Sg1*c* and the signal Sg2*c* applied to the upper drive electrode 14 and the lower drive electrode 15, respectively, and the signal Sg1*d* and the signal Sg2*d* applied to the upper dummy electrode 41 and the lower dummy electrode 42, respectively. In an initial state shown in FIG. 12, the signals Sg1*c*, Sg2*c*, Sg1*d*, and Sg2*d* are set to the ground voltage Vss and the first static actuator 10*a*' is set in the open state.

First, at time t31, the drive circuit 22*c* raises the signal Sg1*c* to the actuating voltage Vact. As a result, the actuating voltage Vact is applied between the upper drive electrode 14 and the lower drive electrode 15, and the first static actuator 10*a*' is switched to the closed state. Next, at time t32, the drive circuit 22*c* lowers the signal Sg1*c* to the hold voltage Vhold. As a result, the hold voltage Vhold is applied between the upper drive electrode 14 and the lower drive electrode 15, and the first static actuator 10*a*' is maintained in the closed state.

Then, at times t33 and after, the drive circuit 22*c* switches the signal Sg1*c* and the signal Sg2*c* alternately between the ground voltage Vss and the hold voltage Vhold with the time period Ca(k). Additionally at times t33 and after, the drive circuit 22*c* first raises the signal Sg1*d* to the hold voltage Vhold and then switches the signal Sg1*d* and the signal Sg2*d* alternately between the ground voltage Vss and the hold voltage Vhold with the fixed time period Ca(k) Here, in an odd-numbered time period Ca(2n−1), the signal Sg2*c* (the lower drive electrode 15) and the signal Sg1*d* (the upper dummy electrode 41) become a higher voltage. And in an even-numbered time period Ca(2n), the signal Sg1*c* (the upper drive electrode 14) and the signal Sg2*d* (the lower dummy electrode 42) become a high voltage.

Advantage of the Semiconductor Device in Accordance with the Fifth Embodiment In the fifth embodiment, the drive circuit 22*c* applies to the upper dummy electrode 41 the signal Sg1*d* that has a reversed phase with respect to the signal Sg1*c* applied to the upper drive electrode 14 (the first static actuator 10*a*'). Thereby, an effect of the two signals is cancelled out to suppress a noise arising due to the signal applied to the upper signal electrode 31.

Moreover, in the fifth embodiment, the drive circuit 22*c* applies to the lower dummy electrode 42 the signal Sg2*d* that has a reversed phase with respect to the signal Sg2*c* applied to the lower drive electrode 15 (the first static actuator 10*a*'). Thereby, an effect of the two signals is cancelled out to suppress a noise arising due to the signal applied to the lower signal electrode 32.

Sixth Embodiment

Configuration of a Semiconductor Device in Accordance with a Sixth Embodiment Next, a configuration of a semiconductor device in accordance with a sixth embodiment is described with reference to FIG. 13. Note that in the sixth embodiment, identical symbols are assigned to configurations similar to those in the fifth embodiment and descriptions thereof are omitted.

Figure 13:
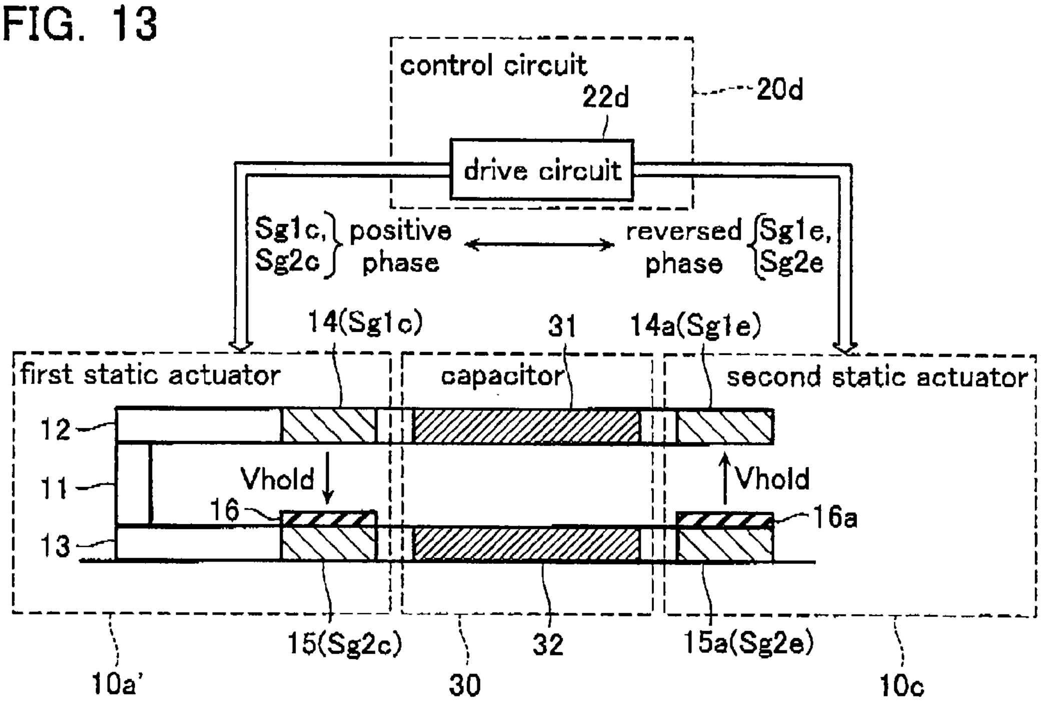
FIG. 13 is a schematic view showing a semiconductor device in accordance with a sixth embodiment of the present invention.

As shown in FIG. 13, the semiconductor device in accordance with the sixth embodiment has a cantilever structure similar to that of the fifth embodiment. However, the semiconductor device in accordance with the sixth embodiment differs from that of the fifth embodiment in that it includes a second static actuator 10*c* in place of the dummy electrode 40. The semiconductor device in accordance with the sixth embodiment includes a control circuit 20*d* configured to control the second static actuator 10*c*.

A drive circuit 22*d* of the control circuit 20*d* inputs the signal Sg1*c* and the signal Sg2*c* to the upper drive electrode 14 and the lower drive electrode 15, respectively. The drive circuit 22*d* inputs a signal Sg1*e* and a signal Sg2*e* to the upper drive electrode 14*a* and the lower drive electrode 15*a*, respectively, applies the actuating voltage Vact and the hold voltage Vhold between the upper drive electrode 14*a* and the lower drive electrode 15*a*, and also switches the polarity of the hold voltage Vhold every time period Ca(k). The signal Sg1*e* is a signal with a reversed phase (a signal with a 180° phase difference) with respect to the signal Sg1*c* at a certain time, and the signal Sg2*e* is a signal with a reversed phase (a signal with a 180° phase difference) with respect to the signal Sg2*c* at a certain time.

Here, a length of a time period and a magnitude of a voltage of the signals inputted to the first static actuator 10*a*' may differ from those of the signals inputted to the second static actuator 10*c*. Moreover, a phase difference between the signal Sg1*c* and the signal Sg1*e*, and a phase difference between the signal Sg2*c* and the signal Sg2*e* is not limited to 180°. That is to say, the time period and the voltage of the signal inputted to the upper drive electrode 14*a* and the lower drive electrode 15*a* need only be set so that the signal generated due to the time period and the voltage of the signal inputted to the upper drive electrode 14 and the lower drive electrode 15 is attenuated by the signal generated due to the time period and the voltage of the signal inputted to the upper drive electrode 14*a* and the lower drive electrode 15*a*.

Figure 14:
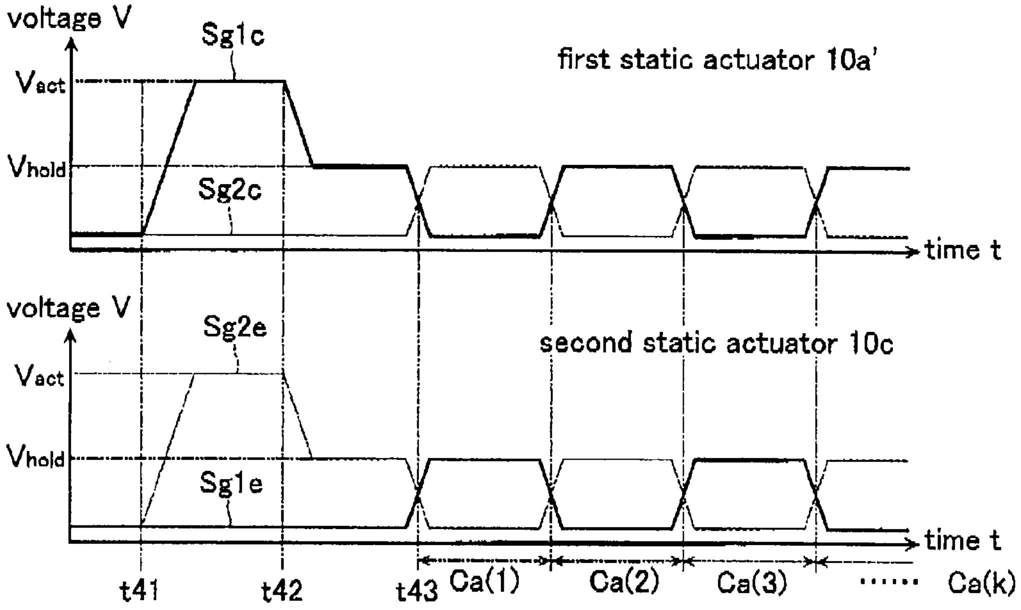
FIG. 14 is a timing chart showing a signal Sg1*c* and a signal Sg2*c* applied to an upper drive electrode 14 and a lower drive electrode 15, respectively, and a signal Sg1*e* and a signal Sg2*e* applied to an upper drive electrode 14*a* and a lower drive electrode 15*a*, respectively, in accordance with the sixth embodiment.

Operation of the Semiconductor Device in Accordance with the Sixth Embodiment FIG. 14 is a timing chart showing the signal Sg1*c* and the signal Sg2*c* applied to the upper drive electrode 14 and the lower drive electrode 15, respectively, and the signal Sg1*e* and the signal Sg2*e* applied to the upper drive electrode 14*a* and the lower drive electrode 15*a*, respectively. In an initial state shown in FIG. 14, the signals Sg1*e* and Sg2*e* are set to the ground voltage Vss and the two static actuators 10*a*' and 10*c* are set in the open state. First, at time t41, the drive circuit 22*d* raises the signal Sg2*e* to the actuating voltage Vact. As a result, the actuating voltage Vact is applied between the upper drive electrode 14*a* and the lower drive electrode 15*a*, and the two static actuators 10*a*' and 10*c* are switched from the open state to the closed state. Next, at time t42, the drive circuit 22*d* lowers the signal Sg2*e* to the hold voltage Vhold. As a result, the hold voltage Vhold is applied between the upper drive electrode 14*a* and the lower drive electrode 15*a*, and the two static actuators 10*a*' and 10*c* are maintained in the closed state.

Then, at times t43 and after, the drive circuit 22*d* switches the signal Sg1*e* and the signal Sg2*e* alternately between the ground voltage Vss and the hold voltage Vhold with the time period Ca(k).

Advantage of the Semiconductor Device in Accordance with the Sixth Embodiment In the sixth embodiment, similarly to the fourth embodiment, the drive circuit 22*d* applies to the upper drive electrode 14*a* (the second static actuator 10*c*) the signal Sg1*e* that has a reversed phase with respect to the signal Sg1*c* applied to the upper drive electrode 14 (the first static actuator 10*a*'). Thereby, an effect of the two signals is cancelled out to suppress a noise arising due to the signal applied to the upper signal electrode 31.

Furthermore, in the sixth embodiment, similarly to the fourth embodiment, the drive circuit 22*d* applies to the lower drive electrode 15*a* (the second static actuator 10*c*) the signal Sg2*e* that has a reversed phase with respect to the signal Sg2*c* applied to the lower drive electrode 15 (the first static actuator 10*a*'). Thereby, an effect of the two signals is cancelled out to suppress a noise arising due to the signal applied to the lower signal electrode 32.

Seventh Embodiment

Configuration of a Semiconductor Device in Accordance with a Seventh Embodiment

Next, a configuration of a semiconductor device in accordance with a seventh embodiment is described with reference to FIG. 15. Note that in the seventh embodiment, identical symbols are assigned to configurations similar to those in the fifth and sixth embodiments and descriptions thereof are omitted.

Figure 15:
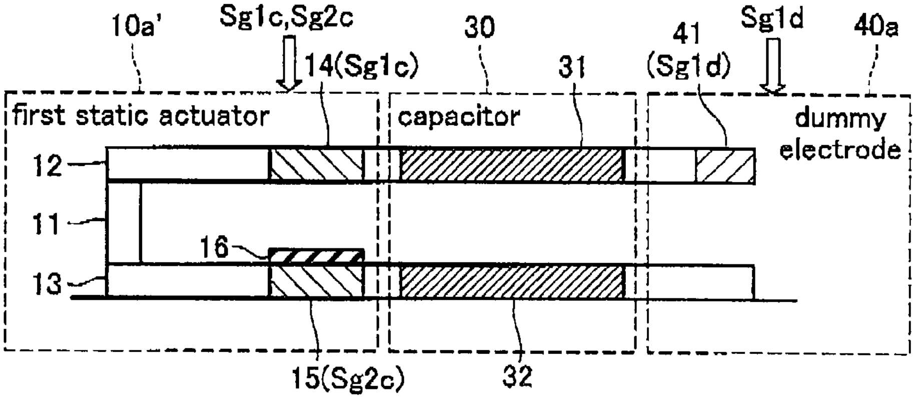
FIG. 15 is a schematic view showing a semiconductor device in accordance with a seventh embodiment of the present invention.

As shown in FIG. 15, the semiconductor device in accordance with the seventh embodiment differs from that of the fifth embodiment in that it includes a dummy electrode 40*a* that has the lower dummy electrode 42 omitted.

Advantage of the Semiconductor Device in Accordance with the Seventh Embodiment

In the seventh embodiment, the drive circuit 22*c* applies to the upper dummy electrode 41 the signal Sg1*d* that has a reversed phase with respect to the signal Sg1*c* applied to the upper drive electrode 14 (the first static actuator 10*a*'). Thereby, an effect of the two signals is cancelled out to suppress a noise arising due to the signal applied to the upper signal electrode 31 (or the lower signal electrode 32).

Eighth Embodiment

Configuration of a Semiconductor Device in Accordance with an Eighth Embodiment

Next, a configuration of a semiconductor device in accordance with an eighth embodiment is described with reference to FIG. 16. Note that in the eighth embodiment, identical symbols are assigned to configurations similar to those in the fifth through seventh embodiments and descriptions thereof are omitted.

Figure 16:
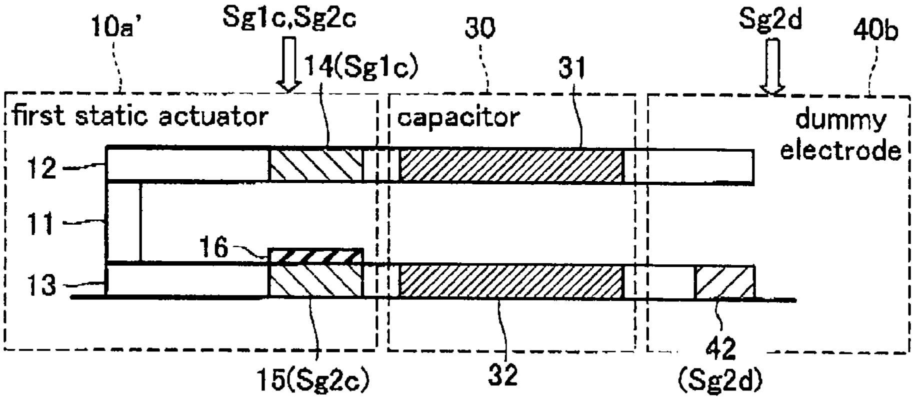
FIG. 16 is a schematic view showing a semiconductor device in accordance with an eighth embodiment of the present invention.

As shown in FIG. 16, the semiconductor device in accordance with the eighth embodiment differs from that of the fifth embodiment in that it includes a dummy electrode 40*b* that has the upper dummy electrode 41 omitted.

Advantage of the Semiconductor Device in Accordance with the Eighth Embodiment

In the eighth embodiment, the fact that the drive circuit 22*c* applies to the lower dummy electrode 42 the signal Sg2*d* that has a reversed phase with respect to the signal Sg2*c* applied to the lower drive electrode 15 (the first static actuator 10*a*') causes an effect of the two signals to cancel out, and enables noise arising due to the signal applied to the upper signal electrode 31 (or the lower signal electrode 32) to be suppressed.

Ninth Embodiment

Configuration of a Semiconductor Device in Accordance with a Ninth Embodiment

Next, a configuration of a semiconductor device in accordance with a ninth embodiment is described with reference to FIG. 17. Note that in the ninth embodiment, identical symbols are assigned to configurations similar to those in the fifth through eighth embodiments and descriptions thereof are omitted.

Figure 17:
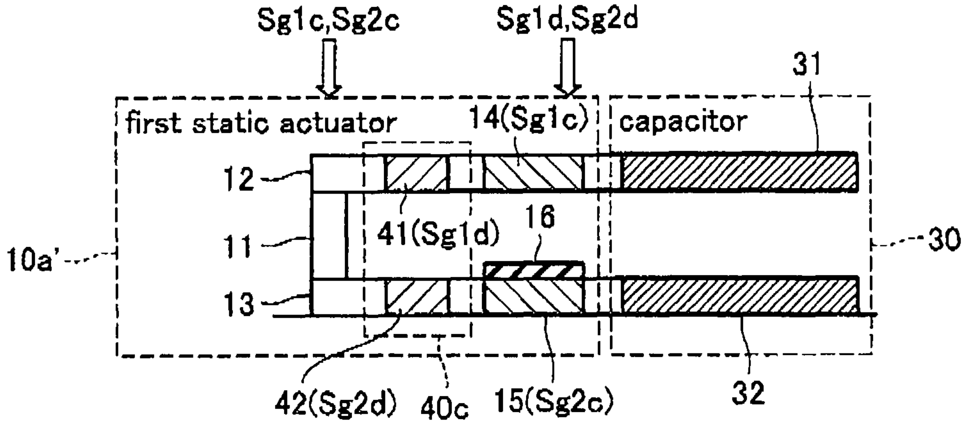
FIG. 17 is a schematic view showing a semiconductor device in accordance with a ninth embodiment of the present invention.

As shown in FIG. 17, the ninth embodiment differs from the fifth embodiment in that a dummy electrode 40*c* has the upper dummy electrode 41 and the lower dummy electrode 42 provided at a side of the movable portion 12 and the fixed portion 13 nearer to the supporting portion 11 than the upper drive electrode 14 and the lower drive electrode 15.

Advantage of the Semiconductor Device in Accordance with the Ninth Embodiment

The semiconductor device in accordance with the ninth embodiment has the same advantages as that of the fifth embodiment.

Tenth Embodiment

Configuration of a Semiconductor Device in Accordance with a Tenth Embodiment

Next, a configuration of a semiconductor device in accordance with a tenth embodiment is described with reference to FIG. 18. Note that in the tenth embodiment, identical symbols are assigned to configurations similar to those in the fifth through ninth embodiments and descriptions thereof are omitted.

Figure 18:
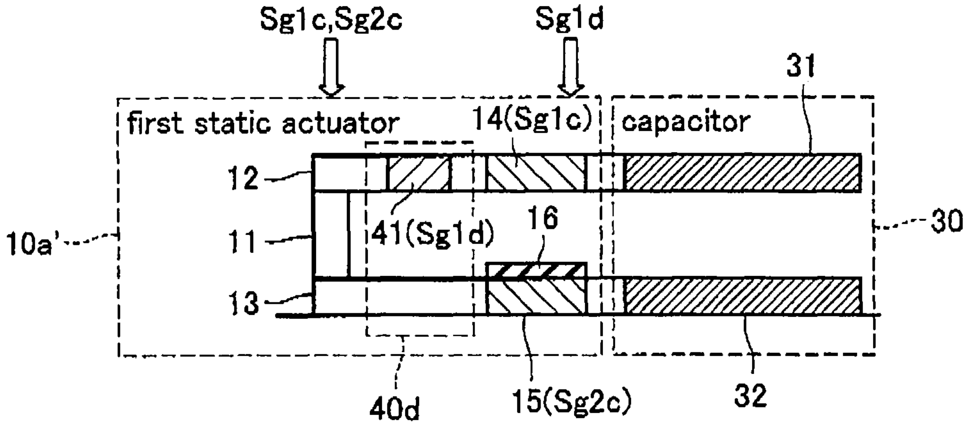
FIG. 18 is a schematic view showing a semiconductor device in accordance with a tenth embodiment of the present invention.

As shown in FIG. 18, the tenth embodiment differs from the seventh embodiment in that a dummy electrode 40*d* has the upper dummy electrode 41 provided at a side of the movable portion 12 nearer to the supporting portion 11 than the upper drive electrode 14.

Advantage of the Semiconductor Device in Accordance with the Tenth Embodiment

The semiconductor device in accordance with the tenth embodiment displays a similar advantage to that of the seventh embodiment.

Eleventh Embodiment

Configuration of a Semiconductor Device in Accordance with an Eleventh Embodiment Next, a configuration of a semiconductor device in accordance with an eleventh embodiment is described with reference to FIG. 19. Note that in the eleventh embodiment, identical symbols are assigned to configurations similar to those in the fifth through tenth embodiments and descriptions thereof are omitted.

Figure 19:
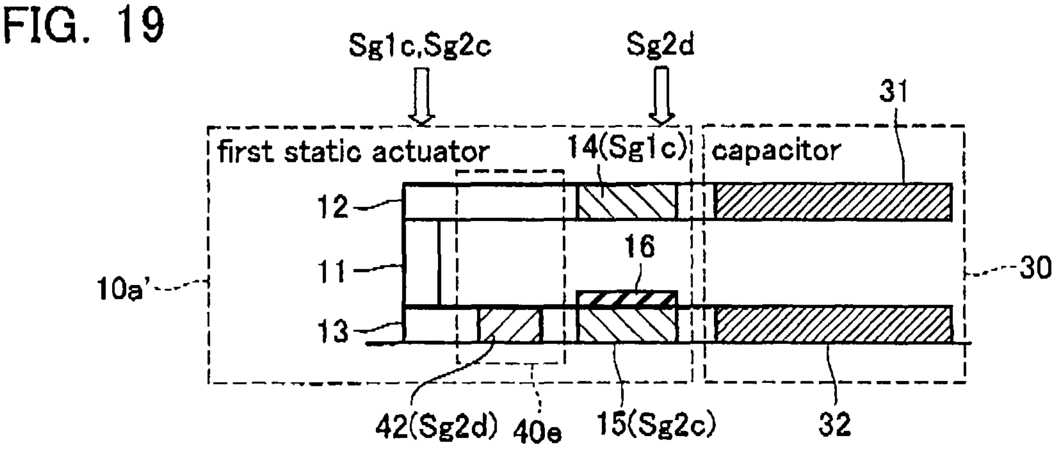
FIG. 19 is a schematic view showing a semiconductor device in accordance with an eleventh embodiment of the present invention.

As shown in FIG. 19, the eleventh embodiment differs from the eighth embodiment in that a dummy electrode 40*e* has the lower dummy electrode 42 provided at a side of the fixed portion 13 nearer to the supporting portion 11 than the lower drive electrode 15.

Advantage of the Semiconductor Device in Accordance with the Eleventh Embodiment The semiconductor device in accordance with the eleventh embodiment displays a similar advantage to that of the eighth embodiment.

Twelfth Embodiment

Configuration of a Semiconductor Device in Accordance with a Twelfth Embodiment

Next, a configuration of a semiconductor device in accordance with a twelfth embodiment is described with reference to FIG. 20. Note that in the twelfth embodiment, identical symbols are assigned to configurations similar to those in the fifth through eleventh embodiments and descriptions thereof are omitted.

Figure 20:
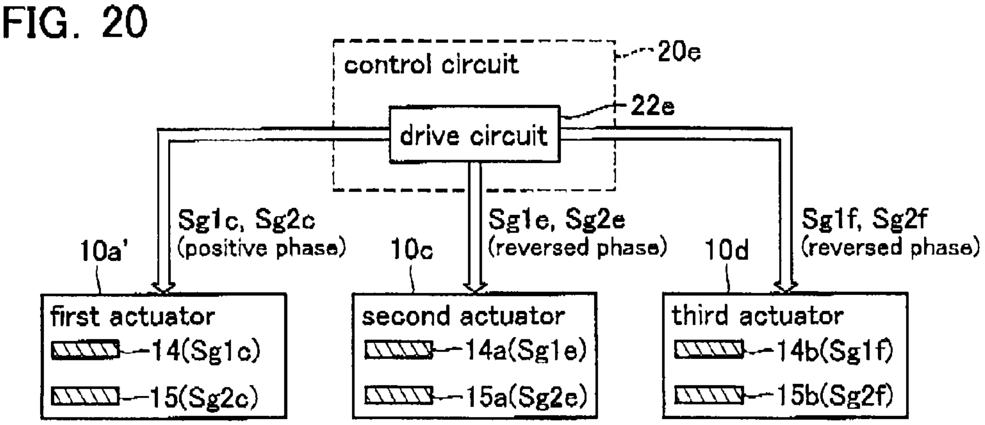
FIG. 20 is a schematic view showing a semiconductor device in accordance with a twelfth embodiment of the present invention.

As shown in FIG. 20, the semiconductor device in accordance with the twelfth embodiment differs from the sixth embodiment in that it includes a third static actuator 10*d* and a drive circuit 22*e* (a control circuit 20*e*) configured to control the first through third static actuators 10*a*', 10*c* and 10*d*.

The third static actuator 10*d* includes an upper drive electrode 14*b* provided in the movable portion 12 and a lower drive electrode 15*b* provided in the fixed portion 13 so as to oppose the upper drive electrode 14*b*, similarly to the first and second static actuators 10*a*' and 10*c*. The upper drive electrode 14*b* and the lower drive electrode 15*b* are formed at a position adjacent to the upper drive electrode 14 and the lower drive electrode 15.

The drive circuit 22*e* (the control circuit 20*e*) inputs the signals Sg1*c* and Sg2*c* to the first static actuator 10*a*' and inputs the signals Sg1*e* and Sg2*e* to the second static actuator 10*b*, similarly to the sixth embodiment. In addition, the drive circuit 22*e* inputs signals Sg1*f* and Sg2*f* to the third static actuator 10*d*. The signal Sg1*f* is inputted to the upper drive electrode 14*b* and is a signal with a reversed phase (having a 180° phase difference) with respect to the signal Sg1*c*. The signal Sg2*f* is inputted to the lower drive electrode 15*b* and is a signal with a reversed phase (having a 180° phase difference) with respect to the signal Sg2*c*.

Advantage of the Semiconductor Device in Accordance with the Twelfth Embodiment The drive circuit 22*e* in the semiconductor device in accordance with the twelfth embodiment can cancel out the signals generated from between the first static actuator 10*a*' and the second static actuator 10*c*, similarly to the previously described embodiments.

Thirteenth Embodiment

Figure 21:
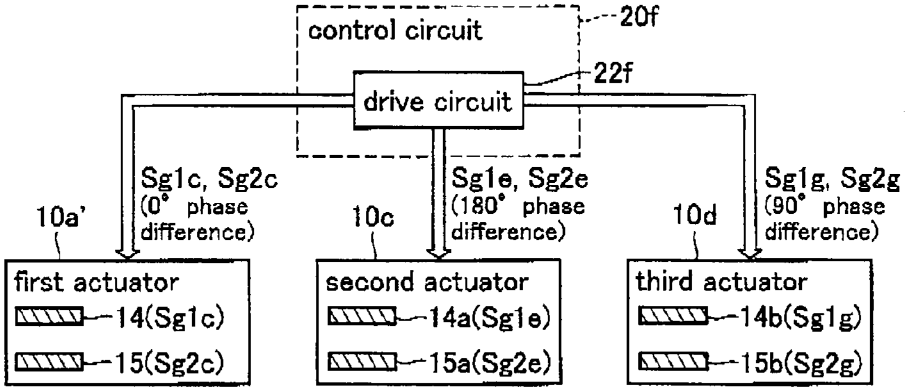
FIG. 21 is a schematic view showing a semiconductor device in accordance with a thirteenth embodiment of the present invention.

Configuration of a Semiconductor Device in Accordance with a Thirteenth Embodiment Next, a configuration of a semiconductor device in accordance with a thirteenth embodiment is described with reference to FIG. 21. Note that in the thirteenth embodiment, identical symbols are assigned to configurations similar to those in the fifth through twelfth embodiments and descriptions thereof are omitted.

The semiconductor device in accordance with the thirteenth embodiment differs from that of the twelfth embodiment in that a drive circuit 22*f* (a control circuit 20*f*) inputs signals Sg1*g* and Sg2*g* to the third static actuator 10*d*. The signal Sg1*g* is inputted to the upper drive electrode 14*b* and has a 90° phase difference with respect to the signal Sg1*c*. The signal Sg2*g* is inputted to the lower drive electrode 15*b* and has a 90° phase difference with respect to the signal Sg2*c*.

That is to say, a time period and a voltage of the signal inputted to the upper drive electrode 14*b* and the lower drive electrode 15*b* is set so that the signal generated due to a time period and a voltage of the signal inputted to the upper drive electrode 14 and the lower drive electrode 15 is attenuated by the signal generated due to the time period and the voltage of the signal inputted to the upper drive electrode 14*b* and the lower drive electrode 15*b*.

Advantage of the Semiconductor Device in Accordance with the Thirteenth Embodiment The drive circuit 22*f* in the semiconductor device in accordance with the thirteenth embodiment can cancel out the signals generated from between the first static actuator 10*a*' and the second static actuator 10*c*, similarly to the previously described embodiments.

Configuration of a Semiconductor Device in Accordance with a Fourteenth Embodiment Next, a configuration of a semiconductor device in accordance with a fourteenth embodiment is described with reference to FIG. 22. Note that in the fourteenth embodiment, identical symbols are assigned to configurations similar to those in the fifth through thirteenth embodiments and descriptions thereof are omitted.

Figure 22:
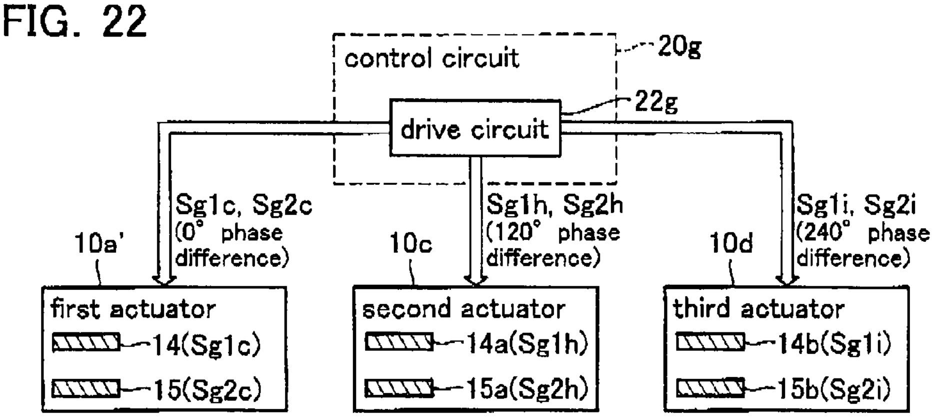
FIG. 22 is a schematic view showing a semiconductor device in accordance with a fourteenth embodiment of the present invention.

As shown in FIG. 22, the semiconductor device in accordance with the fourteenth embodiment differs from that of the twelfth embodiment in that a drive circuit 22*g* (a control circuit 20*g*) inputs signals Sg1*h* and Sg2*h* to the second static actuator 10*c* and inputs signals Sg1*i* and Sg2*i* to the third static actuator 10*d*. The signal Sg1*h* is inputted to the upper drive electrode 14*a* and has a 120° phase difference with respect to the signal Sg1*c*. The signal Sg2*h* is inputted to the lower drive electrode 15*a* and has a 120° phase difference with respect to the signal Sg2*c*. The signal Sg1*i* is inputted to the upper drive electrode 14*b* and has a 240° phase difference with respect to the signal Sg1*c*. The signal sg2*i* is inputted to the lower drive electrode 15*b* and has a 240° phase difference with respect to the signal Sg2*c*.

That is to say, a time period and a voltage of the signal inputted to the upper drive electrode 14*b* and the lower drive electrode 15*b* is set so that the signal generated due to a time period and a voltage of the signal inputted to the upper drive electrode 14 and the lower drive electrode 15 is attenuated by the signal generated due to the time period and the voltage of the signal inputted to the upper drive electrode 14*b* and the lower drive electrode 15*b*.

Advantage of the Semiconductor Device in Accordance with the Fourteenth Embodiment In the semiconductor device in accordance with the fourteenth embodiment, the drive circuit 22*g* applies the signals Sg1*h* and Sg1*i* to the upper drive electrode 14*a* (the second static actuator 10*c*) and the upper drive electrode 14*b* (the third static actuator 10*d*), respectively. The signals Sg1*h* and Sg1*i* respectively has a 120° and 240° phase difference with respect to the signal Sg1*c* applied to the upper drive electrode 14 (the first static actuator 10*a*'). Thereby, the drive circuit 22*g* cancels out an effect of the signals.

Additionally in the semiconductor device in accordance with the fourteenth embodiment, the drive circuit 22*g* applies the signals Sg2*h* and Sg2*i* to the lower drive electrode 15*a* (the second static actuator 10*c*) and the lower drive electrode 15*b* (the third static actuator 10*d*), respectively. The signals Sg2*h* and Sg2*i* respectively has a 120° and 240° phase difference with respect to the signal Sg2*c* applied to the lower drive electrode 15 (the first static actuator 10*a*'). Thereby, the drive circuit 22*g* cancels out an effect of the signals.

That is to say, the drive circuit 22*g* in the semiconductor device in accordance with the fourteenth embodiment can cancel out the signals generated from between the first through third static actuators 10*a*', 10*c* and 10*d*.

Other Embodiments

This concludes description of embodiments of the semiconductor device in accordance with the present invention, but it should be noted that the present invention is not limited to the above-described embodiments, and that various alterations, additions, substitutions, and so on, are possible within a range not departing from the scope and spirit of the invention.

For example, the semiconductor devices in accordance with the fifth through fourteenth embodiments may be configured to include the detection circuit 21 and to have the time period C(k) varied by the drive circuit 22 based on the detected temperature T, as in the first embodiment.

Moreover, in the above-described embodiments, the signal Sg1*d* and the signal Sg2*d* applied to the dummy electrode 40 have an amplitude ranging from the ground voltage Vss to the hold voltage Vhold. However, the signal Sg1*d* and the signal Sg2*d* may have another amplitude.

Furthermore, as mentioned above, in the semiconductor device in accordance with the fourteenth embodiment, the three actuators are controlled by signals having a 120° phase difference with each other. However, in the semiconductor device in accordance with the present invention, N static actuators may be controlled by signals having a (360/N)° phase difference with each other.

What is claimed is:

1. A semiconductor device, comprising:

a first static actuator having a first drive electrode and a second drive electrode, the first drive electrode and the second drive electrode being capable of coming close to each other upon shifting from an open state to a close state due to an electrostatic attractive force against an elastic force thereof;

a second static actuator having a third drive electrode and a fourth drive electrode, the third drive electrode and the fourth drive electrode being capable of coming close to each other upon shifting from an open state to a close state due to an electrostatic attractive force against an elastic force thereof;

a first electrode provided at a position adjacent to the first drive electrode or the second drive electrode; and a drive circuit configured to apply a first voltage between the first drive electrode and the second drive electrode to maintain the first static actuator in the closed state, and to switch a polarity of the first voltage ever first time period, the drive circuit applying a second voltage to the first electrode, the second voltage having a polarity that varies with a second time period, and the second time period and the second voltage being set so that a signal generated due to the first time period and the first voltage is attenuated by a signal generated due to the second time period and the second voltage, wherein the third drive electrode and the fourth drive electrode serves as the first electrode and applied with the second voltage.

2. The semiconductor device according to claim 1, wherein a phase of the signal generated due to the first time period and the first voltage has a 180° phase difference with the signal generated due to the second time period and the second voltage.

3. A semiconductor device, comprising:

a first static actuator having a first drive electrode and a second drive electrode, the first drive electrode and the second drive electrode being capable of coming close to each other upon shifting from an open state to a close state due to an electrostatic attractive force against an elastic force thereof;

a first electrode provided at a position adjacent to the first drive electrode or the second drive electrode;

a second electrode provided at a position adjacent to the first drive electrode or the second drive electrode; and a drive circuit configured to apply a first voltage between the first drive electrode and the second drive electrode to maintain the first static actuator in the closed state, and to switch a polarity of the first voltage ever first time period, the drive circuit applying a second voltage to the first electrode, the second voltage having a polarity that varies with a second time period, and the second time period and the second voltage being set so that a signal generated due to the first time period and the first voltage is attenuated by a signal generated due to the second time period and the second voltage, wherein the drive circuit applies a third voltage to the second electrode, the third voltage having a polarity that varies with a third time period, and wherein the third time period and the third voltage are set so that a signal generated due to the first time period and the first voltage is attenuated by a signal generated due to the third time period and the third voltage.

4. The semiconductor device according to claim 3, wherein a phase of the signal generated due to the first time period and the first voltage, a phase of the signal generated due to the second time period and the second voltage, and a phase of the signal generated due to the third time period and the third voltage have a phase difference of 90° or 120°, respectively.

5. A semiconductor device, comprising:

a first static actuator having a first drive electrode and a second drive electrode, the first drive electrode and the second drive electrode being capable of coming close to each other upon shifting from an open state to a close state due to an electrostatic attractive force against an elastic force thereof;

a first electrode provided at a position adjacent to the first drive electrode or the second drive electrode;

a capacitor including a first signal electrode and a second signal electrode, a distance between the first signal electrode and the second signal electrode being controlled by the first static actuator, the capacitance of the capacitor being variable due to the distance; and a drive circuit configured to apply a first voltage between the first drive electrode and the second drive electrode to maintain the first static actuator in the closed state, and to switch a polarity of the first voltage ever first time period, the drive circuit applying a second voltage to the first electrode, the second voltage having a polarity that varies with a second time period, and the second time period and the second voltage being set so that a signal generated due to the first time period and the first voltage is attenuated by a signal generated due to the second time period and the second voltage.

* * * * *